Dec. 5, 1944.   E. L. BAKER   2,364,336
COOKING STOVE
Filed June 14, 1943

Inventor:
Eugene L. Baker,
by Kenway & Witter
Attorneys

Patented Dec. 5, 1944

2,364,336

UNITED STATES PATENT OFFICE 2,364,336

COOKING STOVE

Eugene L. Baker, Taunton, Mass.

Application June 14, 1943, Serial No. 490,723

6 Claims. (Cl. 126—16)

This invention relates to cooking stoves and more particularly to the oven heating flues thereof. Cooking stoves are commonly constructed to conduct the hot flue gases around and adjacent to the oven and various means, including removable flue pans located beneath the ovens, have been heretofore employed for trapping the soot and cleaning the flues. These pans are fully opened at the top sides and arranged to slide horizontally into the flue chambers beneath the ovens and cooperate with and form a part of the flues, and the stoves are constructed to permit removal of the pans through openings at the front of the stoves as in Patent 1,439,756, or through openings at the rear or side of the stoves, as in patents, No. 77,751 and No. 621,812. My invention contemplates an improved stove construction of this nature employing a substantially closed flue pan slidable into the stove to an oven heating position and having a sole opening thereinto at its rear end adapted to cooperate with the circulating flue of the stove when the pan is placed in working position.

My invention especially concerns an improved construction in which the flue pan forms one side wall of the oven and is removable through the oven whereby eliminating flue pan outlet ordinarily required, improving the oven heating efficiency and enhancing the appearance of the stove. My improved flue pan furthermore eliminates the scattering of loose dirt and soot about the stove since the pan is fully closed except at its rearward end and provides a substantially closed container which can be removed and carried, together with its contents, to the out-of-doors for cleaning. The production of such an improved structure comprises the primary object of the invention.

Figure 1:
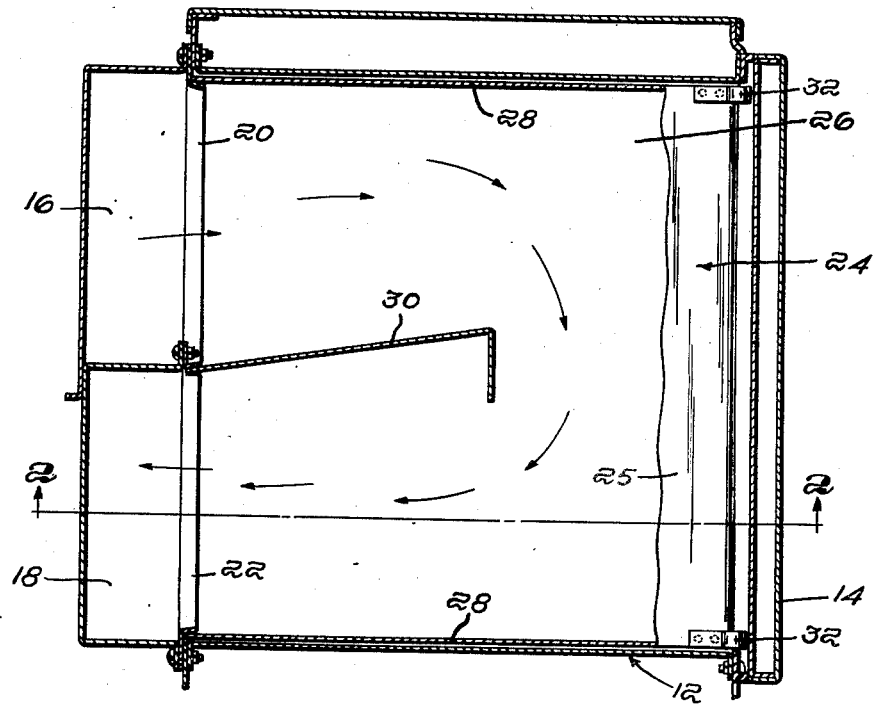
Figure 2:
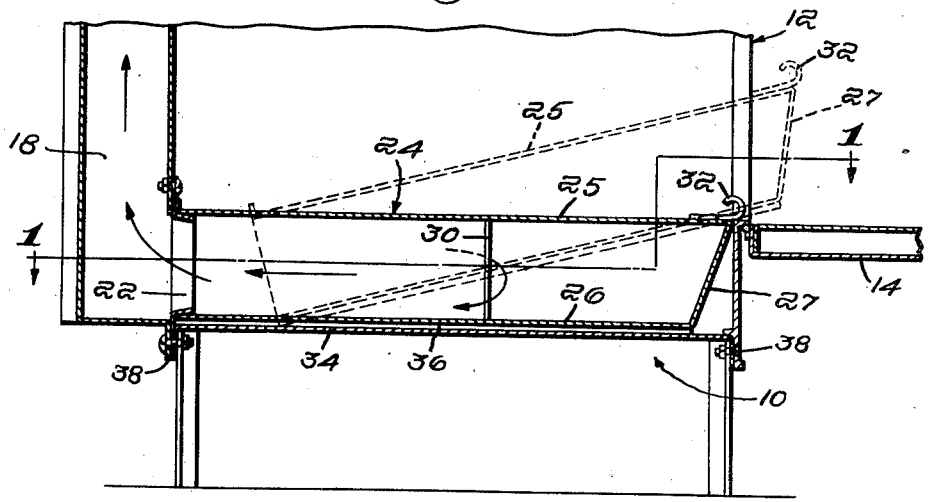

These and other features of the invention will be best understood and appreciated from the following description of a preferred embodiment thereof selected for purposes of illustration and shown in the accompanying drawing wherein, Fig. 1 is a fragmentary plan sectional view, taken on line 1—1 of Fig. 2, through a stove embodying my invention, and Fig. 2 is a sectional view taken on line 2—2 of Fig. 1.

In the drawing, 10 indicates a stove having an oven 12 provided with a door 14 for closing its opening at the front of the stove. The flue at the rear side of the stove has a down draft portion 16 and an up draft portion 18. These flue portions open into the bottom portion of the oven chamber within forwardly directed flanges 20 and 22 surrounding such openings.

My invention contemplates the employment of a relatively shallow clean-out flue pan 24 having top and bottom walls 25 and 26 of large areas and front and side walls 27 and 28 of relatively smaller areas, the pan being open at its rear end and constructed to fit closely over the flanges 20—22. The pan chamber is formed into a U-shaped flue passage by a partition 30 extending forwardly from the mid-portion of its open rear end. The arrangement is such that when the pan is in the working position illustrated the flue gases pass downwardly of the flue 16, through the pan and upwardly of the flue 18, as indicated by the arrows.

The pan is preferably removable through the oven as indicated in broken lines in Fig. 2. Two finger receiving handles 32 are secured to the front of the pan by which the pan can be raised and withdrawn as illustrated. It will be apparent that when the pan is in place it forms a return flue for the hot gases and its top wall forms the bottom wall of the oven. Such arrangement both increases the heating efficiency of the oven and provides a clean-out receptacle which can be removed and carried to the out-of-doors for cleaning. It will also be apparent that the improved structure and arrangement not only increases the operating efficiency of the stove, but furthermore substantially enhances its appearance.

The pan is air tight except for the flue opening at its rear end and, while the top wall 25 forms the bottom wall of the oven, all the remaining walls are in spaced relation to adjacent walls of the stove to provide an air gap therebetween, the bottom wall 26 of the pan being spaced from the bottom wall 34 of the stove to provide an air space 36 therebetween and the other walls of the pan being spaced from stove walls in like manner as illustrated in the drawing. This space forms an insulation conserving the pan heat to the oven and, since the bolted joints 38 of the stove are not air tight, cooling air is drawn into the spaces and circulated around the pan walls. It should be particularly noted that the air space 36 precludes the heating and possible burning of the flooring beneath the oven. It will also be apparent that when the pan is removed the rear flues 16 and 18 can be reached with a brush and thoroughly cleaned through the oven.

Having thus described my invention what I claim as new and desire to secure by Letters Patent of the United States is:

1. In a stove having an oven, a circulating flue at the rear thereof and an opening into the oven at the front thereof, a clean-out flue pan in the bottom portion of the oven chamber and having its rear side open and in communication with the flue, the front portion of the pan being free for elevation in the oven chamber into alignment with said opening and the pan being thereupon removable through the opening.

2. In a stove having an oven, a circulating flue at one wall thereof and an opening into the oven at the opposite side thereof, a clean-out flue pan in the bottom portion of the oven chamber and having one side thereof open and in communication with the flue and the top wall of the pan forming the bottom wall of the oven, the opposite side portion of the pan being free for elevation in the oven chamber into alignment with said opening, and means carried by said opposite side portion of the pan for lifting and removing the pan.

3. In a stove having an oven chamber and a circulating flue adjacent thereto, a relatively shallow flue pan in the stove with one of its walls of greatest area located in oven heating position in the chamber, the pan being closed on all sides except one of the sides of smaller area and which side is open and in communication with the circulating flue, the pan being removable from the stove in a direction away from its said communication with the circulating flue.

4. The structure defined in claim 3 in which the said one wall of the pan of greatest area forms one wall of the oven.

5. In a stove having an oven chamber and a circulating flue adjacent thereto, a flue pan in the stove with one of its walls located in oven heating position in the chamber, the pan being closed except at one side which is open and in communication with the circulating flue, the pan being removable from the stove in a direction away from its said communication with the circulating flue and the remaining walls of the pan being spaced from adjacent walls of the stove and providing insulating air gaps therebetween.

6. In a stove, an oven, in and out draft portions of a circulating flue adjacent to the oven and open to the oven chamber, and a clean-out flue pan in the bottom portion of the oven chamber and having open mouth portions in communication with said draft portions, the pan forming a flue communicating passage between said draft portions and being removable therefrom through the oven, the top wall of the pan forming the bottom wall of the oven.

EUGENE L. BAKER.